United States Patent
Wiley et al.

(10) Patent No.: US 7,000,723 B1
(45) Date of Patent: Feb. 21, 2006

(54) CRUISE CONTROL SYSTEM

(75) Inventors: Thomas D. Wiley, Lovington, IL (US); Herb Poplawski, Racine, WI (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 11/125,862

(22) Filed: May 10, 2005

Related U.S. Application Data (63) Continuation of application No. 10/305,212, filed on Nov. 26, 2002, now Pat. No. 6,915,872.

(51) Int. Cl.
*B60K 31/00* (2006.01)
(52) U.S. Cl. .................. 180/170; 180/305; 74/469
(58) Field of Classification Search ............. None
See application file for complete search history.

(56) References Cited

U.S. PATENT DOCUMENTS

| | | | |
|---|---|---|---|
| 3,732,785 A | 5/1973 | Boydell | |
| 4,281,737 A | 8/1981 | Molzahn | |
| 4,553,626 A | 11/1985 | Kazmierczak et al. | |
| 4,600,075 A | 7/1986 | Heidner et al. | |
| 4,620,575 A | 11/1986 | Cuba et al. | |
| 4,727,710 A | 3/1988 | Kuhn | |
| 4,955,249 A * | 9/1990 | Wetor | 74/473.21 |
| 5,044,478 A * | 9/1991 | Kaesgen et al. | 192/220.1 |
| 5,094,077 A | 3/1992 | Okada | |
| 5,168,970 A | 12/1992 | Hough et al. | |
| 5,201,692 A | 4/1993 | Johnson et al. | |
| 5,228,360 A | 7/1993 | Johnson | |
| 5,241,872 A | 9/1993 | Betz et al. | |
| 5,314,387 A | 5/1994 | Hauser et al. | |
| 5,791,230 A | 8/1998 | Goellner | |
| 5,836,159 A | 11/1998 | Shimizu et al. | |
| 5,934,400 A | 8/1999 | Larsen et al. | |
| 6,092,617 A | 7/2000 | White, III et al. | |
| 6,122,996 A | 9/2000 | Hauser et al. | |
| 6,202,779 B1 | 3/2001 | Musat | |
| 6,233,931 B1 | 5/2001 | Mutsufuji | |
| 6,253,637 B1 | 7/2001 | Hauser et al. | |
| 6,272,854 B1 | 8/2001 | Ishii et al. | |
| 6,314,730 B1 | 11/2001 | Shimizu | |
| 6,322,474 B1 | 11/2001 | Hauser | |
| 6,487,857 B1 | 12/2002 | Poplawski et al. | |

* cited by examiner

*Primary Examiner*—Christopher P. Ellis
*Assistant Examiner*—Christopher Bottorff
(74) *Attorney, Agent, or Firm*—Neal, Gerber & Eisenberg LLP (57) ABSTRACT

A control mechanism for a hydraulic assembly is disclosed. The control mechanism comprises a hydraulic pump, a swash plate, a control arm, a return to neutral mechanism and a cruise control arm. The control arm is linked to the swash plate and is moveable in such a manner so as to provide the swash plate with a plurality of non-discrete angular orientations with respect to the hydraulic pump. The return to neutral mechanism is used to move the control arm from a driving position to a neutral position. The cruise control arm is moveable between a first position and a second position. In the first position, the cruise control arm is disengaged from the control arm. In the second position, the cruise control arm engages the control arm to resist movement of the control arm from one of a plurality of non-discrete forward driving positions to the neutral position under the influence of the return to neutral mechanism.

19 Claims, 12 Drawing Sheets

CRUISE CONTROL SYSTEM

BACKGROUND OF THE INVENTION

This invention relates generally to hydrostatic transmissions and, more particularly, to a cruise control system for use in connection with a hydrostatic transmission.

Hydrostatic transmissions ("HSTs"), including integrated hydrostatic transmissions ("IHTs"), are well known in the art and are more fully described in, among others, U.S. Pat. No. 5,314,387, which is incorporated herein by reference in its entirety. Generally, an HST includes a center section or the like on which is mounted a hydraulic pump and a hydraulic motor. The hydraulic pump and the hydraulic motor each carry a plurality of reciprocating pistons that are in fluid communication through porting formed in the center section. As the hydraulic pump rotates, the pump pistons move axially as they bear against an adjustable swash plate where the angular orientation of the swash plate affects the degree of axial movement of the pump pistons. The movement of the pump pistons forces a hydraulic fluid through the porting to the motor pistons which causes the motor pistons to be forced against a thrust bearing to thereby rotate the hydraulic motor. As the hydraulic motor rotates, hydraulic fluid is returned to the hydraulic pump through the porting. In this manner, the rotation of the hydraulic pump is translated to the hydraulic motor to drive one or more axles of a riding lawn mower, small tractor, or the like.

For maintaining a desired hydrostatically driven vehicle speed, various speed control systems are known in the art. By way of example, speed control systems are disclosed in U.S. Pat. Nos. 4,620,575, 4,553,626, 4,281,737, 4,727,710, 5,228,360, and 6,202,779. While such known speed control mechanisms do work for their intended purpose, they do suffer disadvantages related to their size, cost, and complexity. Accordingly, it is an object of the present invention to provide an improved cruise control system.

SUMMARY OF THE INVENTION

In accordance with the object of this invention, a cruise control system is disclosed which is selectively engaged and disengaged by an operator independent of the function of the control arm of the hydraulic pump. The cruise control system allows the control arm to be maintained in a plurality of non-discrete positions. Also disclosed is a brake actuated return to neutral mechanism that may be used to disengage the cruise control mechanism by means of a linkage connected to a brake pedal, handle, or the like.

A better understanding of the objects, advantages, features, properties and relationships of the invention will be obtained from the following detailed description and accompanying drawings which set forth illustrative embodiments that are indicative of the various ways in which the principles of the invention may be employed.

BRIEF DESCRIPTION OF THE DRAWINGS

For a better understanding of the invention, reference may be had to preferred embodiments shown in the following drawings in which.

DETAILED DESCRIPTION

Figure 1:
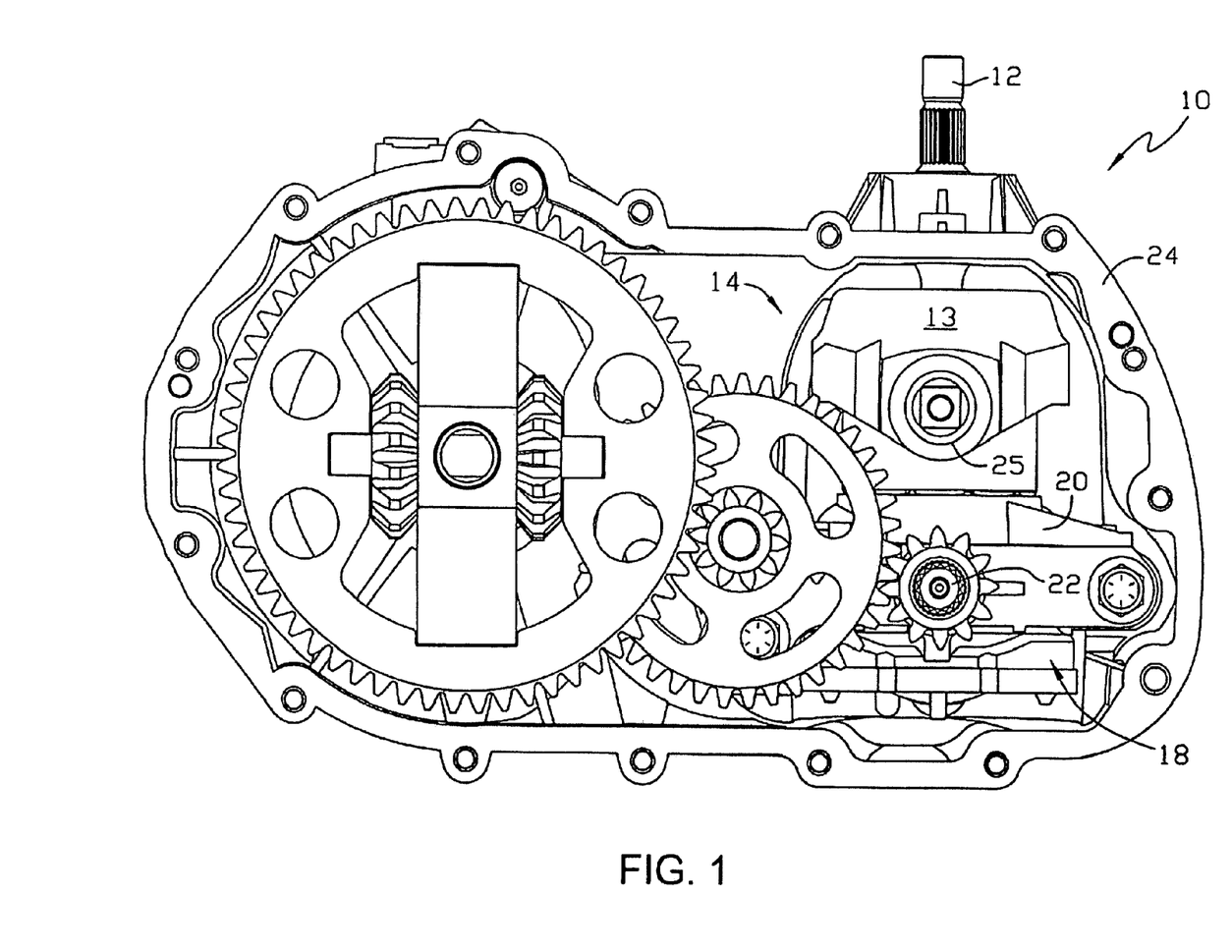
FIG. 1 illustrates an internal view of an exemplary embodiment of a hydrostatic transmission.
Figure 6:
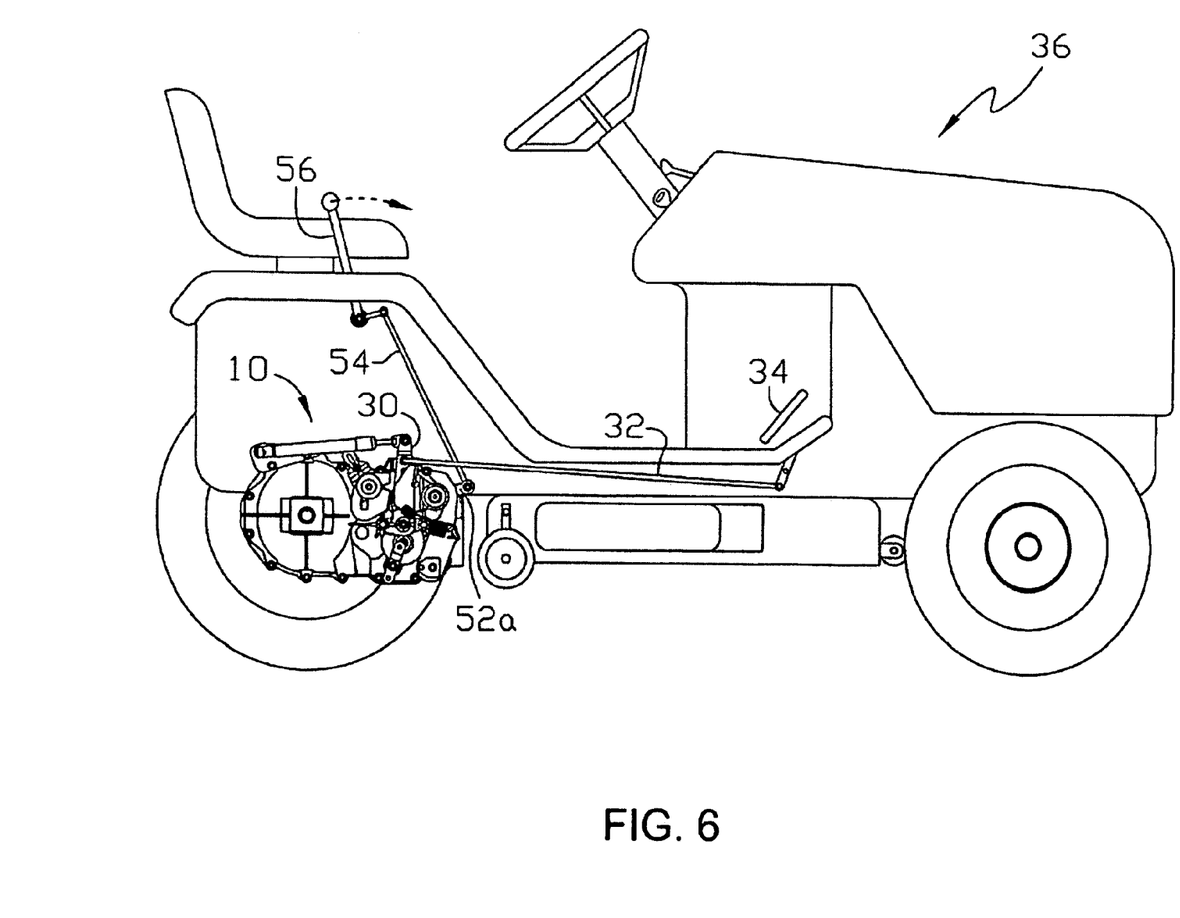
FIG. 6 illustrates the hydrostatic transmission and cruise control system of FIG. 2 installed on an exemplary vehicle.

Turning now to the figures, wherein like reference numerals refer to like elements, there is illustrated in FIG. 1 an exemplary hydrostatic transmission in the form of an IHT 10. As will be understood by those of skill in the art, the IHT 10 generally operates on the principle of an input shaft 12 rotatably driving a hydraulic pump 14 which, through the action of its pump pistons, pushes hydraulic fluid to a hydraulic motor (not shown) through porting formed in a center section 20 to cause the rotation of the hydraulic motor. The rotation of the hydraulic motor causes the rotation of a motor shaft 22 which rotation is eventually transferred through a gearing system or the like to drive one axle shaft (in the case of a zero-turn hydrostatic transaxle) or a pair of axle shafts (as illustrated in FIG. 6). A motive force from, for example, an engine may be supplied directly to the input shaft 12 or indirectly by means of a pulley to drive the hydraulic pump 14. For a more detailed description of the principles of operation of such a hydrostatic transmission, the reader is referred to U.S. Pat. Nos. 5,201,692, 6,322,474 and 6,122,996 which are incorporated herein by reference in their entirety.

To support the components of the IHT 10, the IHT 10 is provided with a housing 24. In the illustrated example, the housing 24 comprises a first side housing section and a second side housing section that are joined along a substantially vertical junction surface. Extending from the top of the housing 24 is the input shaft 12. Meanwhile, the axle shafts in the illustrated example would extend from both the first side housing section and the second side housing section. Thus, in the illustrated, exemplary IHT 10, the axis of the axle shafts would be generally perpendicular to the substantially vertical junction surface. Similarly, in the illustrated embodiment, since the center section 20 is generally "L-shaped," the plane of the pump running surface of the center section 20 is generally perpendicular to the substantially vertical junction surface while the plane of the motor running surface of the center section 20 is generally parallel to the substantially vertical junction surface. The axis of the motor shaft 22 would be generally parallel to the axis of the axle shafts and perpendicular to the axis of the input shaft 12. It is to be understood, however, that this arrangement is merely illustrative and that the housing and/or IHT operating components can be otherwise arranged without departing from the scope of this invention.

For placing the hydraulic pump 14 in fluid communication with the hydraulic motor, the center section 20 includes hydraulic porting. The hydraulic porting is in further fluid communication with a source of makeup fluid, such as a fluid sump or a charge gallery. Generally, the hydraulic porting comprises a high pressure side through which fluid moves from the hydraulic pump 14 to the hydraulic motor and a low pressure side through which fluid returns from the hydraulic motor to the hydraulic pump 14. A filter assembly 18 may be positioned adjacent the center section 20, intermediate the sump and the hydraulic porting, to minimize the introduction of impurities, such as metal shavings, into the hydraulic circuit when makeup fluid is drawn into the hydraulic circuit.

To adjust the amount of oil that is forced from the hydraulic pump 14 to the hydraulic motor via the high pressure side hydraulic porting, the IHT 10 includes a moveable swash plate 13 against which the pump pistons travel. The direction of rotation of the hydraulic pump 14 is fixed by the rotation of the input shaft 12 and, as such, the hydraulic pump 14 is nearly always rotated in one direction. As will be understood by those of ordinary skill in the art, the swash plate 13 may be moved to a variety of positions to vary the stroke of the pump pistons and the direction of rotation of the hydraulic motor. Generally, as the angular orientation of the swash plate 13 is varied in one direction from the neutral position the axial displacement or stroke of the pump pistons is varied, which then drives the hydraulic motor in a direction determined by the hydraulic porting at a speed that is related to the volume of the fluid displaced by the pump pistons taking into consideration the efficiency of the system. In the neutral position, the swash plate 13 does not function to axially displace the pump pistons.

Rotation of the hydraulic motor results from the motor pistons moving against a thrust bearing under the influence of the hydraulic fluid. As the angular orientation of the swash plate 13 is decreased to pass through the neutral position, the direction of rotation of the hydraulic motor is reversed and the speed of the hydraulic motor is again influenced by the volume of fluid displaced by the pump pistons. Since the speed of rotation of the hydraulic motor is dependent upon the amount of hydraulic fluid pumped thereinto by the hydraulic pump 14 and the direction of rotation of the hydraulic motor is dependent upon the angular orientation of the swash plate 13, the angular orientation of the swash plate 13 is seen to control the speed and direction of rotation of the hydraulic motor and, as will be apparent, the speed and direction of rotation of the axle shaft(s) 23.

For moving the swash plate 13, the swash plate 13 has trunnion arms 25 and 27 that are rotatably supported in the housing 24 of the IHT 10. Rotation of a trunnion arm 25 (or 27) changes the angular orientation of the swash plate 13 with respect to the pump pistons. To rotate the trunnion arm 25 and, accordingly, move the swash plate 13, a control arm 30 is coupled to the trunnion arm 25. As illustrated in FIG. 6, the control arm 30 may be connected, via a driving link 32 or the like, to a lever, pedal, etc. (collectively referred to as a pedal 34) provided on a vehicle 36 whereby movement of the pedal 34 is translated to the control arm 30 to cause the rotation of the trunnion arm 25 and movement of the swash plate 13.

Figure 4:
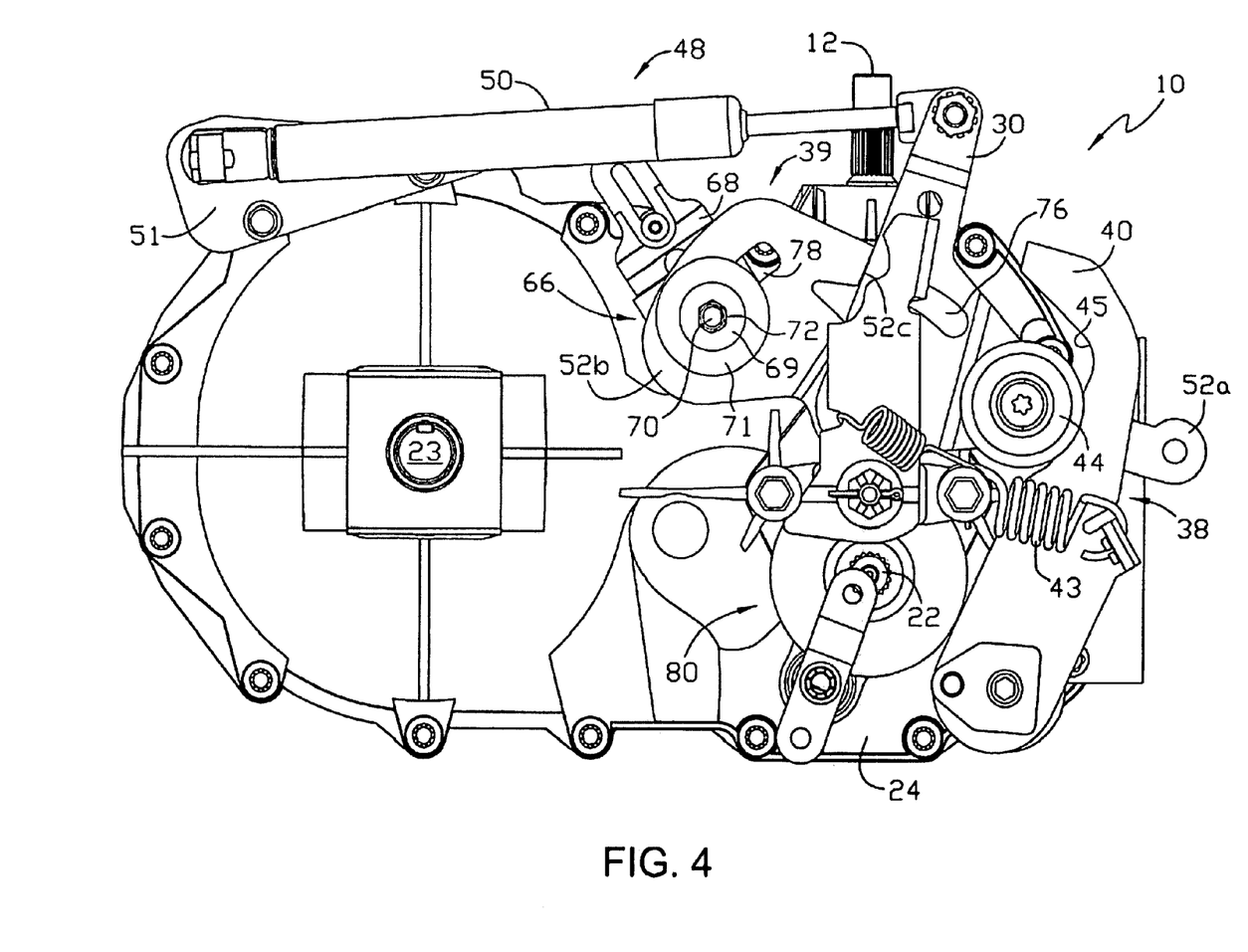
FIG. 4 illustrates the cruise control system of FIG. 2 in an activated position with the hydrostatic transmission in a forward driving position and wherein a portion of a brake arm has been removed to provide an unobstructed view of certain elements thereof.
Figure 5:
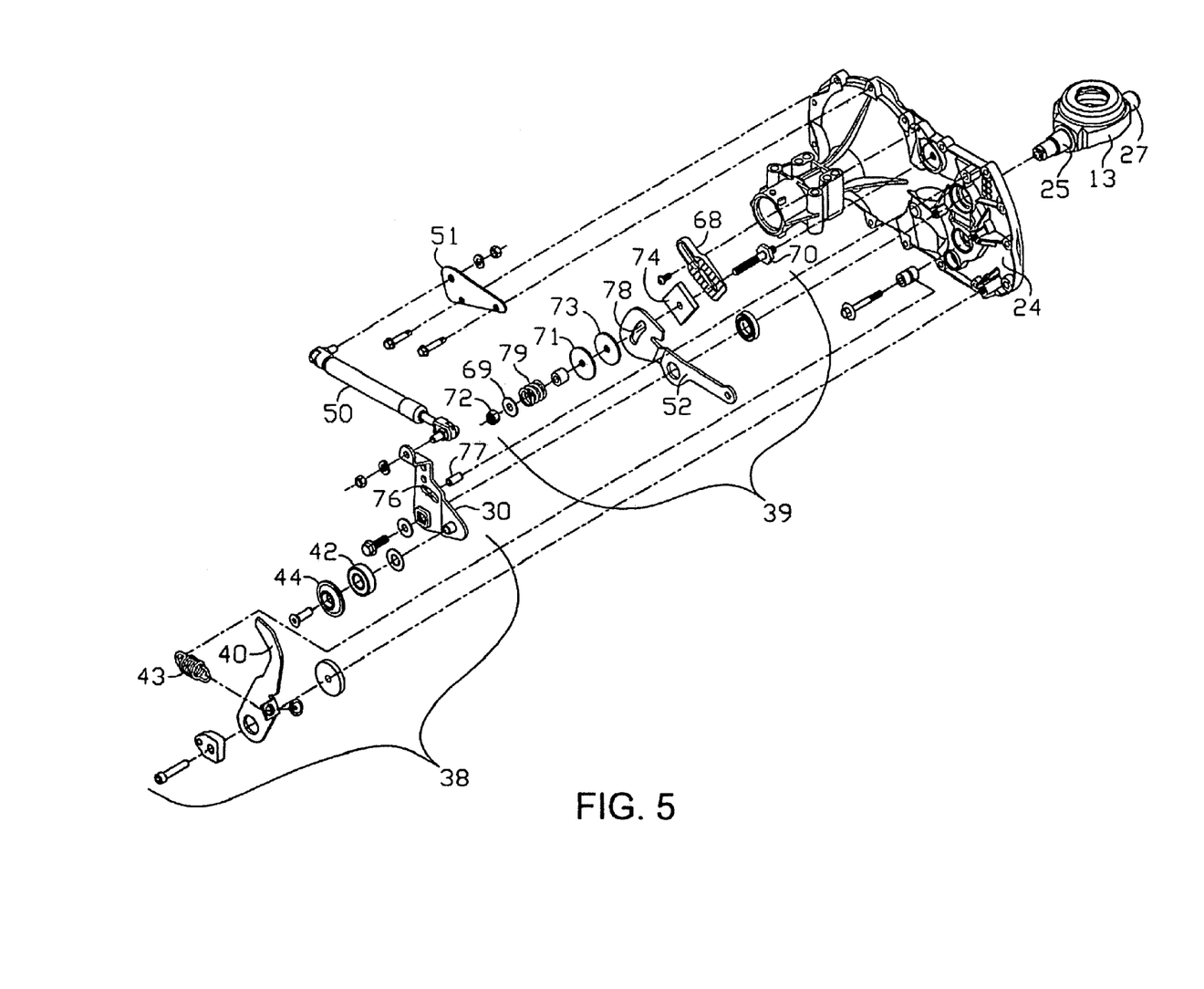
FIG. 5 illustrates an exploded view of the cruise control system of FIG. 2.

To return the HST 10 from a driving position (i.e., one in which the swash plate 13 has an angular orientation that causes axial displacement of the pump pistons) to the neutral position, a return to neutral ("RTN") mechanism 38 may be mounted to the housing 24 that cooperatively engages the control arm 30. Generally, as illustrated in FIGS. 2–5, an exemplary RTN mechanism 38 comprises a return arm 40 that is rotationally mounted to the housing 24. The return arm 40 further comprises a generally arcuate surface that engages, for example, a bearing 42 that is mounted on or otherwise formed as part of the control arm 30, as illustrated in FIG. 5. A spring 43 serves to bias the rotationally mounted return arm 40 against the bearing 42.

Figure 2:
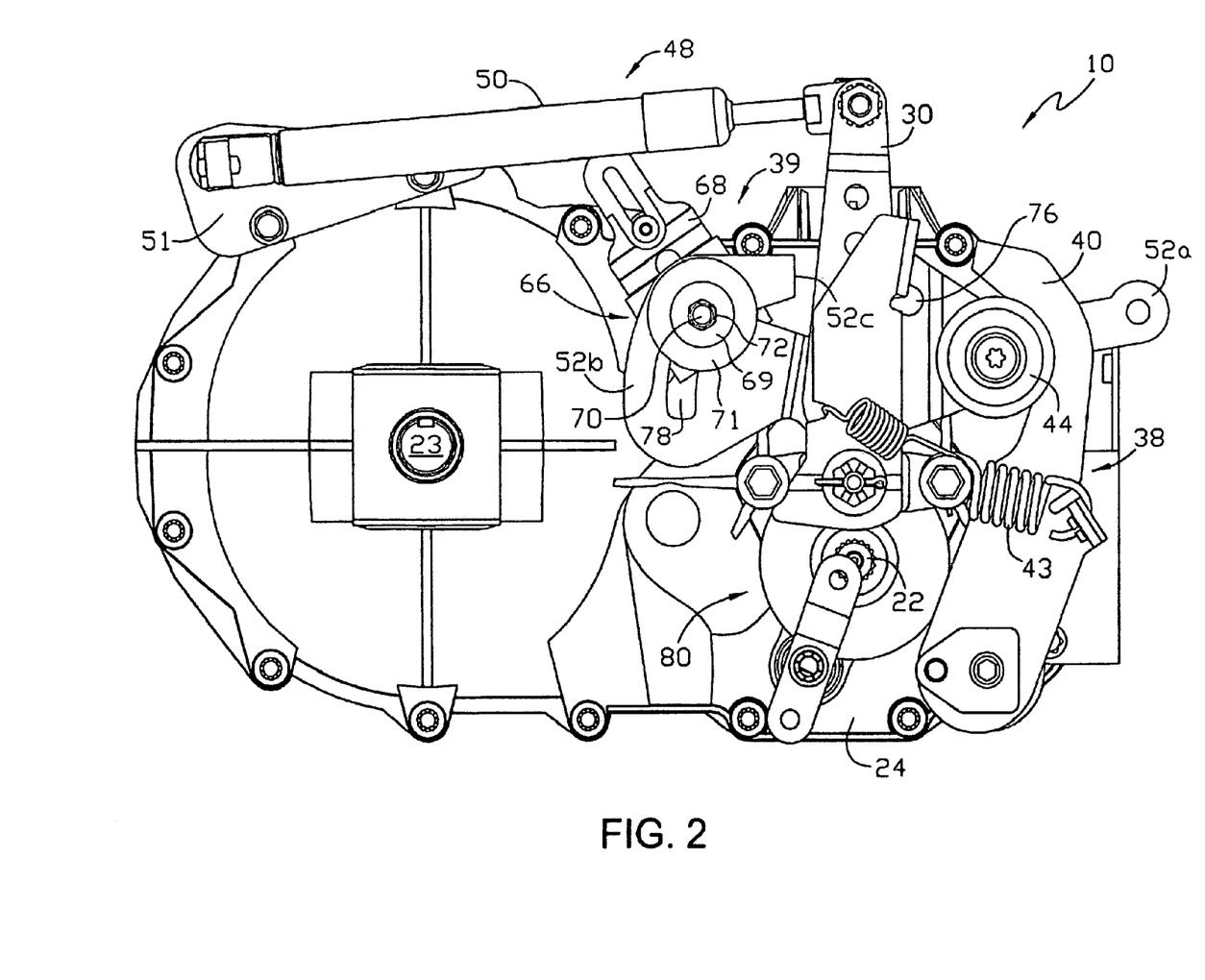
FIG. 2 illustrates a side view of an exemplary cruise control system installed on the hydrostatic transmission of FIG. 1 in which the cruise control system is in a deactivated position with the hydrostatic transmission in a neutral position.
Figure 3:
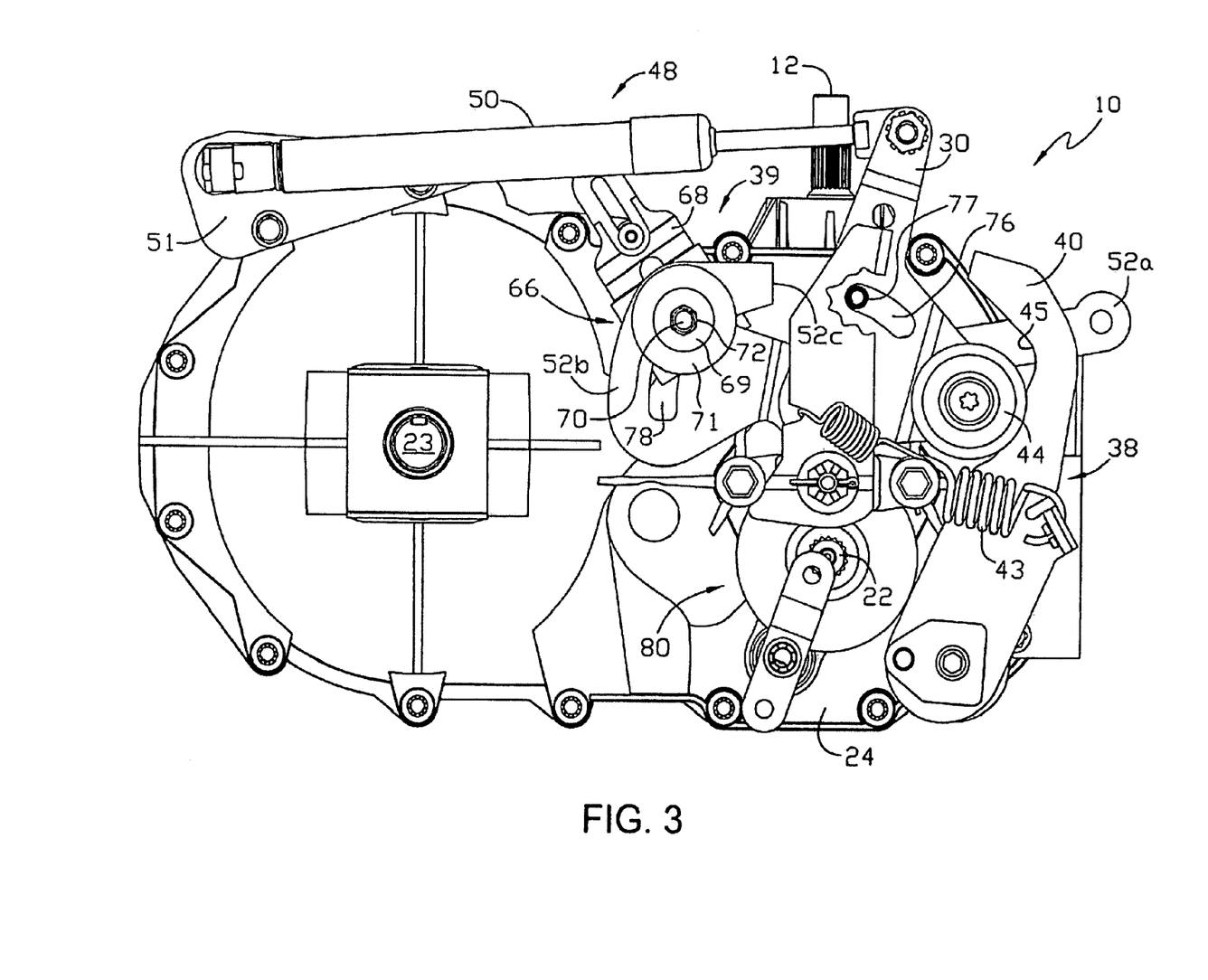
FIG. 3 illustrates the cruise control system of FIG. 2 in a deactivated position with the hydrostatic transmission in a forward driving position and wherein a portion of a brake arm has been removed to provide an unobstructed view of certain elements thereof.

In operation, when the control arm 30 is moved from the neutral position, illustrated in FIG. 2, to a driving position, illustrated as the forward driving position in FIG. 3, the control arm bearing 42 moves against the arcuate surface of the return arm 40 which causes the return arm 40 to rotate against the bias of the spring 43. When the control arm 30 is released, for example when the pedal 34 is released, the biasing force of the spring 43 causes the return arm 40 to rotate in a direction toward the control arm 30. This inward movement of the return arm 40 causes the arcuate surface of the return arm 40 to force the control arm bearing 42 along the arcuate surface. The return arm 40 continues to move in this manner until further movement of the return arm 40 is inhibited, i.e., the control arm bearing 42 becomes positioned in the well 45 of the arcuate return arm surface. When the control arm bearing 42 stops moving under the influence of the biased return arm 40, the control arm 30 will have been moved to a position that places the swash plate 13 in the neutral position. It will be appreciated that the arcuate nature of the engaging surface of the return arm 40 allows the RTN mechanism 38 to function when the control arm 30 is moved into either the forward and reverse driving directions.

For use in maintaining engagement between the return arm 40 and bearing 42, a cap 44 may be affixed adjacent to bearing 42 that functions to laterally constrain the return arm 40 on bearing 42. To dampen movement of the control arm 30 as it is being moved into a forward or reverse drive position and when the control arm 30 is being returned to the neutral position under the influence of the RTN mechanism 38, the control arm 30 may be attached to a dampening mechanism 48. In the illustrated example, the dampening mechanism 48 comprises a two-way piston 50 attached at one end to the housing 24 via a piston bracket 51 and at the other end to the control arm 30. The two-way action of the piston 50 allows movement of the control arm 30 to be dampened when being moved to or from the neutral position. Alternatively, the dampening mechanism 48 may be linked to the RTN mechanism 38.

For use in maintaining a relative position of the control arm 30 and, accordingly, an angular orientation of the swash plate 13, to thereby generally maintain a desired hydrostatically driven vehicle speed when the control arm 30 is released (e.g., the pedal 34 is released), a cruise control mechanism 39 may be mounted to the housing 24 that is adapted to cooperatively engage the control arm 30. Generally, as illustrated in FIGS. 2–5, an exemplary cruise control mechanism 39 comprises a pivotally mounted cruise control arm 52 having a first arm portion 52a and a second, opposite arm portion 52b. The first arm portion 52a may be connected via a linkage 54, for example, to a cruise control lever 56 or the like. As will be appreciated from the description that follows, the cruise control lever 56 may be moved to rotate the cruise control arm 52, via the linkage 54, into a non-discrete position in which the cruise control arm 52 engages the control arm 30 to inhibit movement of the control arm 30 under the influence of the RTN mechanism 38, as illustrated in FIG. 4. The cruise control lever 56 may also be moved to rotate the cruise control arm 52 into an inactive position, as illustrated in FIGS. 2 and 3. In the inactive position, the cruise control arm 52 will not be in a position to interfere with the functioning of the RTN mechanism 38 described above. It is further preferred that, when in the fully inactive cruise control position, the control arm 30 is free to move over its full range of motion without contact with the cruise control arm 52. While the cruise control arm 52 is illustrated as pivoting about the trunnion arm 25, it will be appreciated that other pivot points can be provided and, as such, the illustrated arrangement is not intended to be limiting.

For engaging the control arm 30 to thereby effect cruise control, the cruise control arm 52 may be configured such that the cruise control arm portion 52a has a portion 52c that falls within a plane generally occupied by the control arm 30. While the portion 52c is illustrated as a generally flat extension, it will be appreciated that the portion 52c can be formed as a protuberance or other feature that is arranged to fall at least partly within the same general plane as the control arm 30. In this manner, as illustrated in FIG. 4, rotation of the cruise control arm 52 functions to place the portion 52c of the cruise control arm 52 at a location in which the portion 52c is capable of contacting a side of the control arm 30.

To maintain a position of engagement between the cruise control arm portion 52c and the control arm 30 against the biasing force of the RTN mechanism 38, the cruise control arm portion 52a may be restrained by a friction pack 66. Such a friction pack 66 may generally include an optional, axially adjustable wedge 68 (which may be used to adjust the position of the cruise control arm 52—in particular portion 52c—with respect to the control arm 30) and frictional elements 73 and 74 between which the cruise control arm 52 is positioned. The frictional elements 73 and 74 may be constructed from plastic or nylon. A bolt 70, nut 72, and washer 69, or like component(s), may be used to vary the degree of the frictional engagement imparted by the frictional elements 73 and 74 upon the cruise control arm 52 by compressing spring 79 against a washer 71 which then compresses frictional elements 73 and 74 against the cruise control arm portion 52b. It will be appreciated that, since the friction pack 66 functions to apply a force upon the cruise control arm 52 that is sufficient to inhibit movement of the cruise control arm 52 under the influence of a force applied via the control arm 30 and RTN mechanism 38, the cruise control feature can be disabled by simply loosening the friction pack 66, i.e., to lessen the frictional engagement to the point where the frictional force applied to the cruise control arm 52 is insufficient to withstand a force applied via the control arm 30 and RTN mechanism 38. For more detail regarding such a friction pack, the reader is referred to U.S. Pat. No. 6,253,637 that is incorporated herein by reference in its entirety. While the aforementioned discussion details a specific configuration of an exemplary friction pack, it will be appreciated that other friction pack configurations may be readily adapted to mate with the cruise control arm 52. As such, the described friction pack configuration should not be read as being required.

It will be further appreciated that the cruise control mechanism 38 illustrated in FIGS. 1–6 only functions to generally maintain a desired hydrostatically driven vehicle speed in the forward driving direction. Thus, in illustrated example, the cruise control arm 52 only functions to inhibit the movement of the control arm 30 when the control arm 30 is being forced in the counter-clockwise direction (i.e., in the direction of the cruise control arm 52) by the RTN mechanism 38. The cruise control arm 52 will not inhibit the movement of the control arm 30 when the control arm 30 is being forced in the clockwise direction (i.e., in a direction away from the cruise control arm 52) by the RTN mechanism 38. The cruise control mechanism 38 does, however, allow the cruise control arm 52 to be positioned in any of a plurality of non-discrete positions allowing for a plurality of non-discrete forward driving speeds to be generally maintained.

To limit the range of motion of the control arm 30, the control arm 30 may be provided with a slot 76 in which is disposed a pin 77 or the like that is fixedly secured to the housing 24. In this manner, one end of the slot 76 will engage the pin 77 when the control arm 30 attains the allowed, full forward driving position (illustrated in FIG. 3) and the other end of the slot 76 will engage the pin 77 when the control arm 30 attains the allowed, full reverse driving position. Similarly, to limit the range of motion of the cruise control arm 52, the cruise control arm 52 may be provided with a slot 78 in which is disposed the mounting bolt 70. Accordingly, one end of the slot 78 will engage the bolt 70 when the cruise control arm 52 attains the allowed, fully active cruise control position (illustrated in FIG. 4) and the other end of the slot 78 will engage the bolt 70 when the cruise control arm 52 attains the allowed, fully inactive cruise control position (illustrated in FIGS. 2 and 3).

To slow and/or stop movement of the motor shaft 22 and, accordingly, movement of the axle shaft(s) 23, for example, to prevent free-wheeling of the vehicle 36, a parking brake mechanism 80 may be mounted to the housing 24 so as to engage the motor shaft 22. It will be appreciated that the brake mechanism 80 may be a disc brake mechanism, as illustrated in FIGS. 1–5, a cogged parking brake (not illustrated), or the like. Since such parking brake mechanisms are well known, they will not be discussed in greater detail herein for the sake of brevity.

Illustrated in FIGS. 7–12 is a further embodiment of a cruise control system 39' that operates in connection with a brake activated RTN 38'. The brake activated RTN 38' functions to return the HST 10' from a driving position to the neutral position and generally comprises a return arm 40' that is rotationally mounted to the housing 24'. The return arm 40' again comprises a generally arcuate surface that engages, for example, a bearing 42 that is mounted on or otherwise formed as part of a control arm 30' that is linked to the swash plate 13. As particularly illustrated in FIGS. 11 and 12, a spring 43' is provided for biasing the rotationally mounted return arm 40' against the bearing 42. To this end, one end of the spring 43' is attached to an end of the return arm 40' while the other end of the spring 43' is attached to the housing 24', for example, via a mounting bracket 24a.

Figure 7:
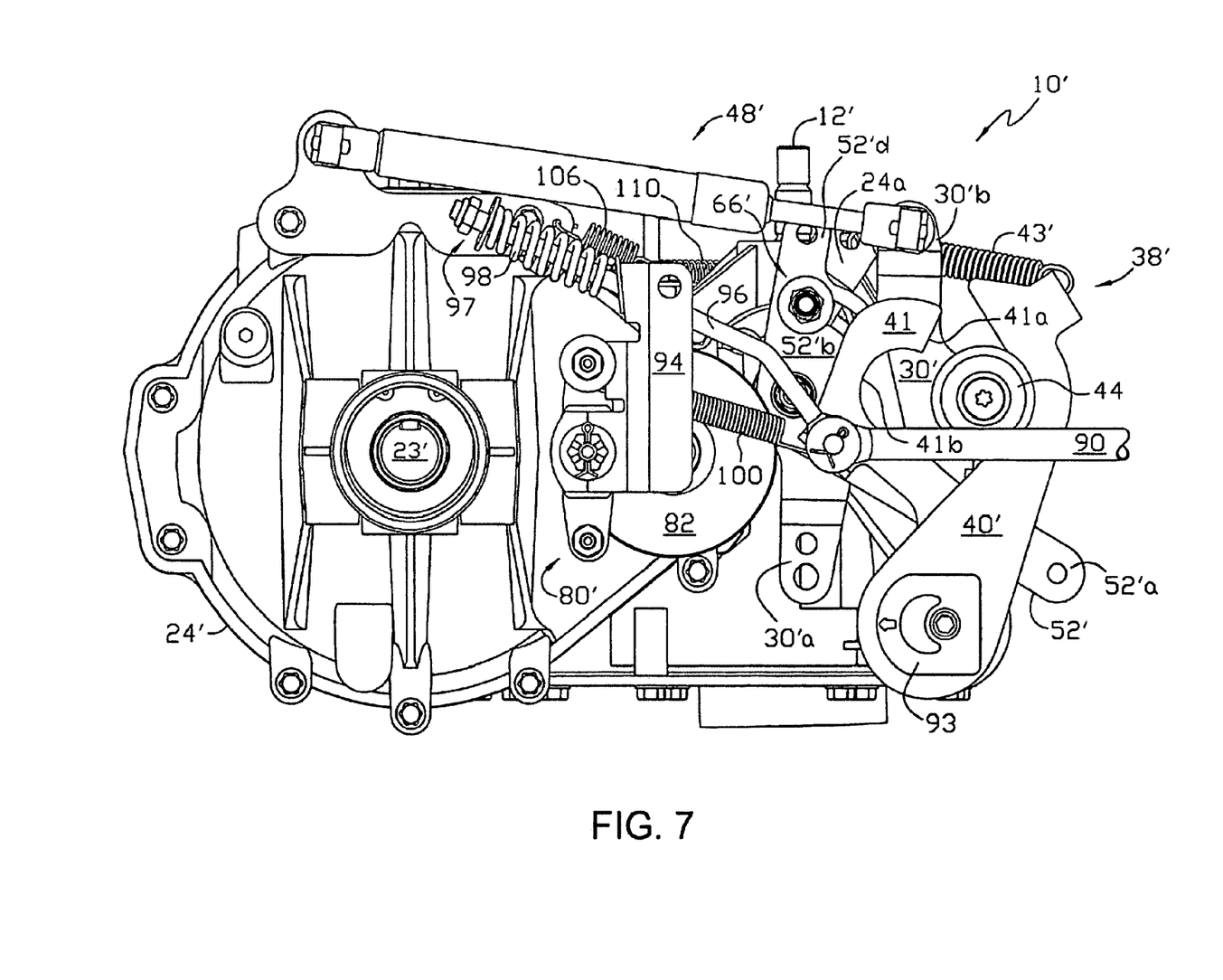
FIG. 7 illustrates a side view of a further, exemplary cruise control system installed on a further, exemplary hydrostatic transmission in which the cruise control system is in a deactivated position, the hydrostatic transmission is in a neutral position, and the brake activated return to neutral mechanism is deactivated.
Figure 8:
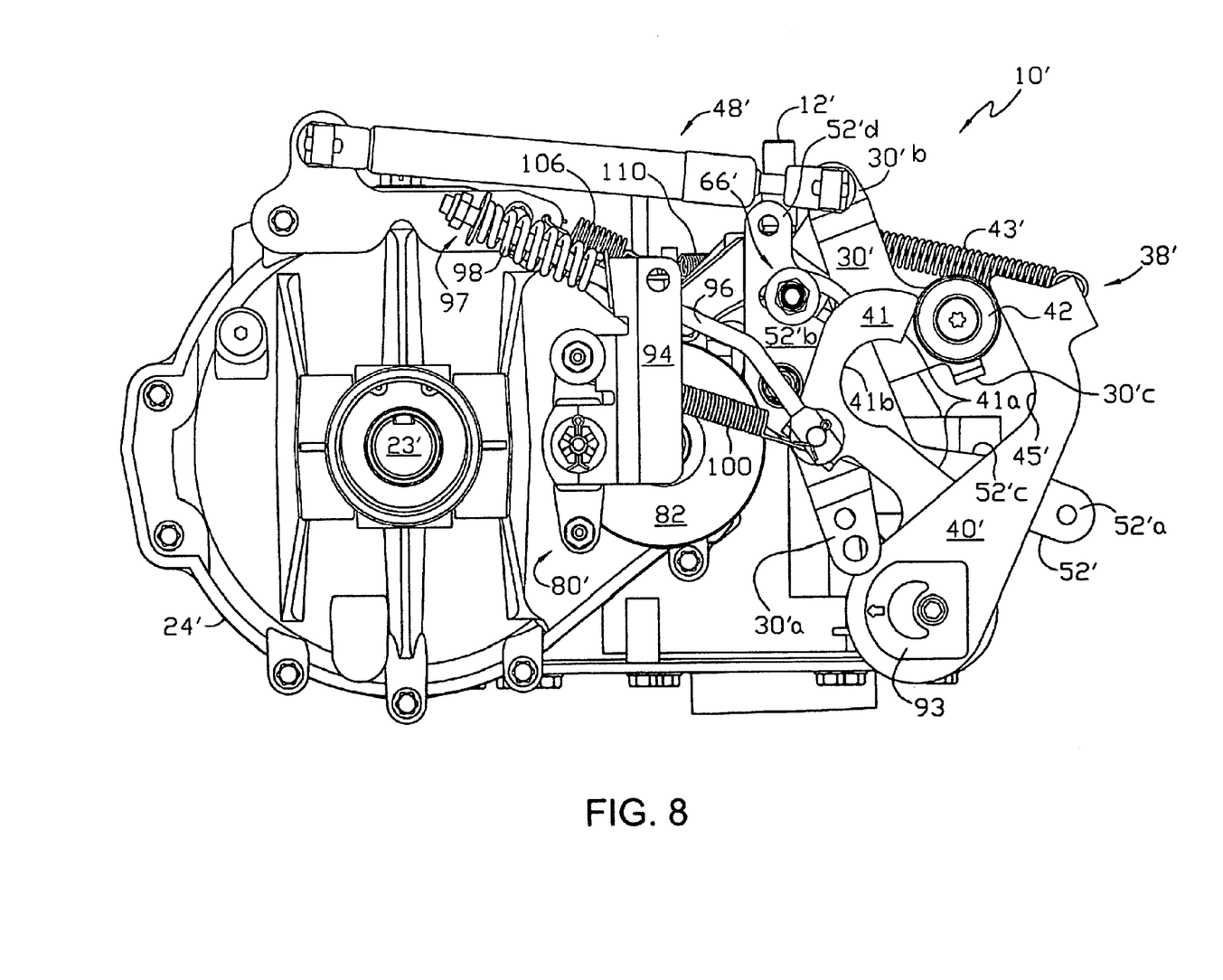
FIG. 8 illustrates the cruise control system of FIG. 7 in a deactivated position with the hydrostatic transmission in a forward driving position and wherein a bearing cap has been removed to provide an unobstructed view of certain elements thereof.

In operation, when the control arm 30' is moved from the neutral position, illustrated in FIG. 7, to a driving position, illustrated as the forward driving position in FIG. 8, the control arm bearing 42 moves against the arcuate surface of the return arm 40' which causes the return arm 40' to rotate against the bias of the spring 43'. When the control arm 30' is released, for example when the pedal 34 (connected via a linkage to control arm portion 30'$a$) is released, the biasing force of the spring 43' causes the return arm 40' to rotate in a direction toward the control arm 30'. This inward movement of the return arm 40' causes the arcuate surface of the return arm 40' to force the control arm bearing 42 along the arcuate surface. The return arm 40' continues to move in this manner until further movement of the return arm 40' is inhibited, i.e., the control arm bearing 42 becomes positioned in the well 45' of the arcuate return arm surface. When the control arm 30' stops moving in this manner, the control arm 30' will have been moved to a position that places the swash plate 13 in the neutral position. The position of the well 45' corresponding to neutral may be adjusted by means of a return arm neutral adjusting cam 93.

For use in maintaining engagement between the return arm 40' and bearing 42, a cap 44, shown in FIG. 7, may be affixed adjacent to bearing 42 that functions to laterally constrain the return arm 40' on bearing 42. This cap 44 has been removed from FIGS. 8–10 and 12 so as to allow a view of the engagement between the bearing 42 and the return arm 40'. To dampen movement of the control arm 30' as it is being moved into a forward or reverse drive position and when the control arm 30' is being returned to the neutral position under the influence of the RTN 38', a dampening mechanism 48' may be attached to control arm portion 30'$b$.

Figure 9:
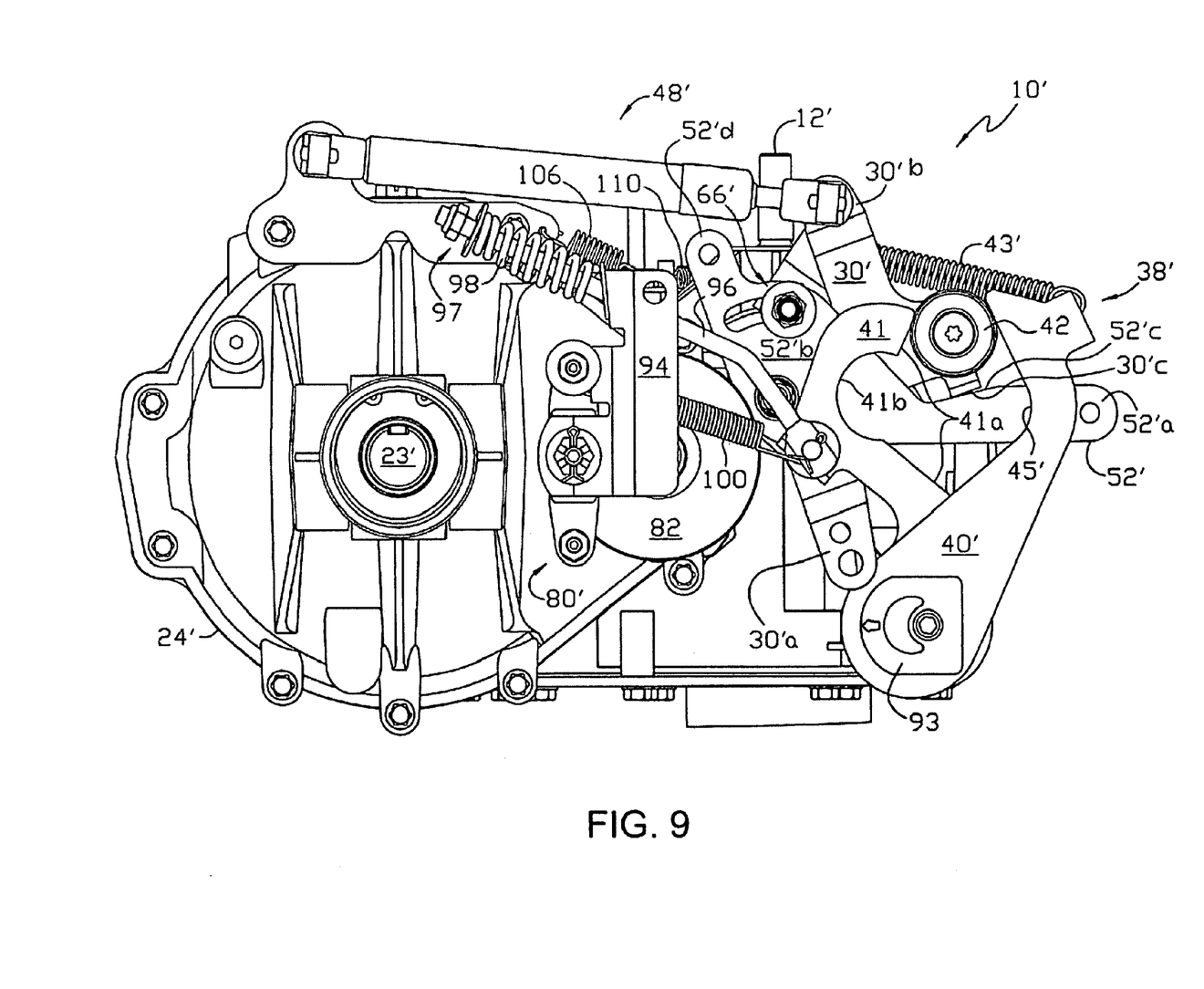
FIG. 9 illustrates the cruise control system of FIG. 7 in an activated position with the hydrostatic transmission in a forward driving position and wherein a bearing cap has been removed to provide an unobstructed view of certain elements thereof.
Figure 10:
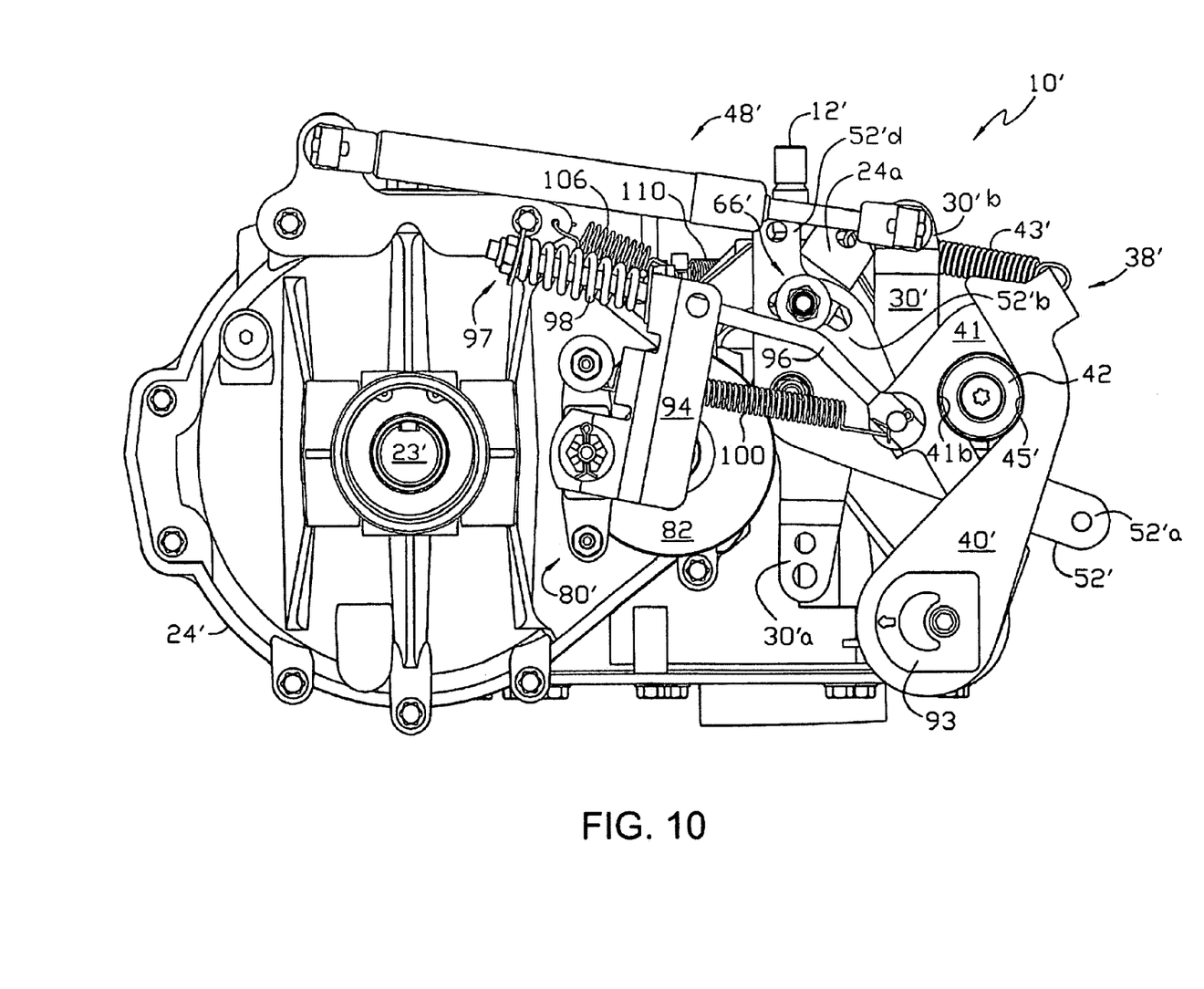
FIG. 10 illustrates the cruise control system of FIG. 9 after the brake has been activated.

For use in maintaining a relative position of the control arm 30' and, accordingly, an angular orientation of the swash plate 13, to thereby generally maintain a desired hydrostatically driven vehicle speed when the control arm 30' is released, a cruise control mechanism 39' may be mounted to the housing 24' that is adapted to cooperatively engage the control arm 30'. Generally, the cruise control system 39' comprises a cruise control arm 52' which, by way of example only and as illustrated in FIGS. 7–12, is pivotally mounted over the trunnion arm. The cruise control arm 52' has a first arm portion 52'$a$, a second arm portion 52'$b$, a third arm portion 52'$c$, and a fourth arm portion 52'$d$. The first arm portion 52'$a$ or the fourth arm portion 52'$d$ may be connected, for example, via a linkage to a cruise control lever or the like. The cruise control lever may then be moved to rotate the cruise control arm 52' into a non-discrete position in which the cruise control arm 52' engages the control arm 30' to inhibit movement of the control arm 30' under the influence of the RTN mechanism 38', as illustrated in FIG. 9. The cruise control lever may also be moved to rotate the cruise control arm 52' into an inactive position, illustrated in FIGS. 7 and 8. In the inactive position, the cruise control arm 52' will not be in a position to interfere with the functioning of the RTN mechanism 38'. It is again preferred that, when in the fully inactive cruise control position, the control arm 30' is free to move over its full range of motion without contact with the cruise control arm 52'.

For engaging the control arm 30' to thereby effect cruise control, the cruise control arm 52' may be configured such that the cruise control arm portion 52'$a$ has a portion 52'$c$ that falls within a plane generally occupied by the control arm 30'. While the portion 52'$c$ is illustrated as being a generally flat extension of the cruise control arm 52', it will be appreciated that the portion 52'$c$ can be formed as a protuberance or other feature that is arranged to fall at least partially within the same general plane as the control arm 30'. As will be appreciated, a protuberance 30'$c$ may be formed as part of or attached to the control arm 30' to achieve a similar function as a protuberance associated with the cruise control arm 52'. Still further, there may be provided overlapping protuberances formed on the control arm 30' and cruise control arm 52'. In accordance with any of these arrangements, rotation of the cruise control arm 52' functions to place the portion 52'$c$ of the cruise control arm 52' at a location in which the portion 52'$c$ is capable of contacting a side of the control arm 30' as is illustrated in FIG. 9.

To maintain a position of engagement between the cruise control arm 52' and the control arm 30' against the biasing force of the RTN mechanism 38', the cruise control arm portion 52'$b$ may be restrained by a friction pack 66'. This frictional force may be overcome, however, when a brake is actuated as will be described hereinafter.

It will be again appreciated that the cruise control mechanism 38' illustrated in FIGS. 7–12 only functions to generally maintain a desired hydrostatically driven vehicle speed in the forward driving direction. Thus, in the example illustrated in FIGS. 7–11, the cruise control arm 52' only functions to inhibit movement of the control arm 30' when the control arm 30' is being forced in the clockwise direction by the RTN mechanism 38'. The cruise control arm 52' will not inhibit movement of the control arm 30' when the control arm is being forced in the counter-clockwise direction by the RTN mechanism 38'. The cruise control mechanism 38' does, however, allow the cruise control arm 52' to be positioned in any of a plurality of non-discrete positions allowing for a plurality of non-discrete forward driving speeds to be generally maintained.

To slow and/or stop movement of the motor shaft 22 and, accordingly, movement of the axle shaft(s) 23', for example, to prevent free-wheeling of the vehicle 36, a brake mechanism 80' may be mounted to the housing 24' so as to engage the motor shaft 22. As illustrated in FIGS. 7–12, the brake mechanism 80' may be a disc brake mechanism that is cooperatively mounted to the motor shaft 22. For use in returning the control arm 30' to the neutral position, the brake mechanism 80' is further adapted to cooperate with the RTN mechanism 39'. As will be discussed hereinafter, the control arm 30' may be returned to the neutral position when the brake is actuated without requiring the cruise control mechanism 38' to be separately disengaged.

For use in actuating the brake mechanism 80', the brake mechanism 80' may be attached via a linkage 90, illustrated in FIG. 7, to a brake pedal, brake lever, or the like. More specifically, the linkage 90 is rotationally attached to a rotationally mounted brake return arm 41 such that movement of the linkage 90 causes the brake return arm 41 to drive the bearing 42 to force the control arm 30' to neutral. For this purpose, the brake return arm 41 is provided with angled surfaces 41$a$ that functions to drive the bearing 42 (from either the forward or reverse driving positions) towards the well 45' of the return arm 40' as the brake return arm 41 is moved towards the bearing 42. During such movement, the biasing force of spring 43' maintains the return arm 40' against the bearing 42. Furthermore, if the control arm 30' is being driven from a forward driving position and the cruise control 39' is activated, movement of the control arm 30' under the force of the brake return arm 41 also moves the cruise control arm 52' with which the control arm 30' is in engagement. As noted previously, the driving force of the linkage 90 and brake return arm 41 is sufficient to overcome the restraining forces of the friction pack 66' acting upon the cruise control arm 52'. As movement of the brake return arm 41 continues in this manner, the brake return arm 41 will move the control arm 30' until the bearing 42 is seated in the well 45' of the return arm 40' and a well 41b formed in the brake return arm 41. As will be apparent from FIG. 10, when the brake is actuated the well 41b functions to engage the bearing 42 so as to prevent movement of the control arm 30' to maintain the control arm 30' in the neutral position.

For actuating the brake mechanism 80', the brake return arm 41 is connected via a link 96 to a rotationally mounted brake actuating arm 94 that is adapted to drive, for example, brake disc 82 into engagement with a frictional element (not visible). The link 96 is rotationally mounted to the brake return arm 41 at one end and passes through an opening in the brake actuating arm 94 where a spring 98 is positioned between the brake actuating arm 94 and the opposite end of the link 96. A nut and washer combination or the like 97 may be provided at the end of the link 96 to provide a restraining surface that engages the end of the spring 98 that is opposite the brake actuating arm 94. In this manner, when the brake link 90 and the brake return arm 41 are moved, seen for example by comparing FIGS. 9 and 10, the link 96 is driven to cause compression of the spring 98 which, in turn, exerts an increasing amount of pressure upon the brake actuating arm 94 so as to rotate the brake actuating arm 94 to drive the brake disc 82 into engagement with the frictional element. In particular, by the time the bearing 42 is in the neutral position, the compression force of the spring 98 on the brake actuating arm 94, resulting from the movement of the brake return arm 41 and link 96, is sufficient to put the brake disc 82 into a state of engagement with the frictional element that will maintain the vehicle in a stopped condition. When the brake lever and linkage 90 are released, a spring 100, attached between the housing 24 and brake return arm 41, functions (in cooperation with spring 98 and spring 106 discussed hereinafter) to return the brake return arm 41, and accordingly the brake mechanism 80', to the disengaged state.

Figure 11:
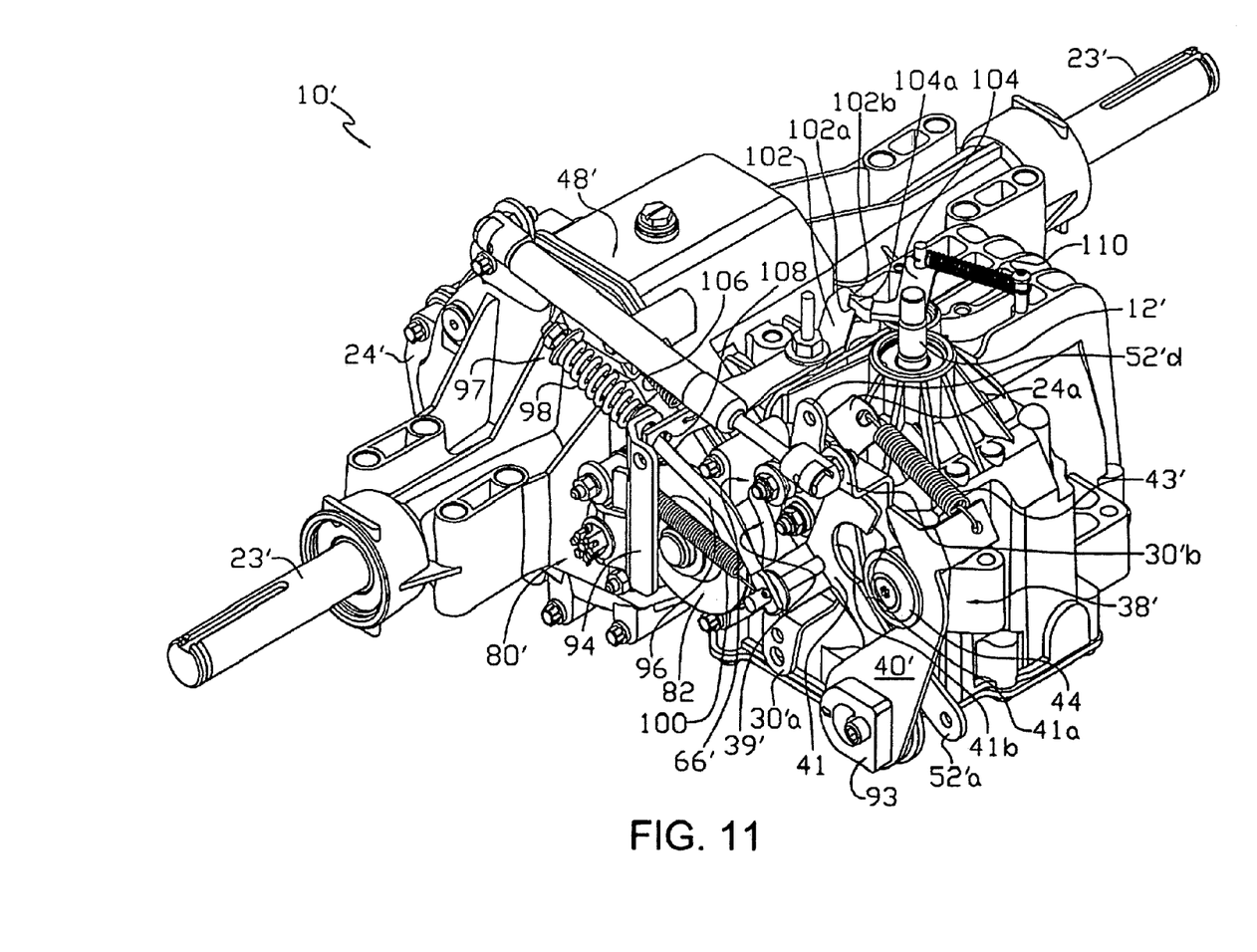
FIG. 11 illustrates an isometric view of the cruise control system illustrated in FIG. 7.
Figure 12:
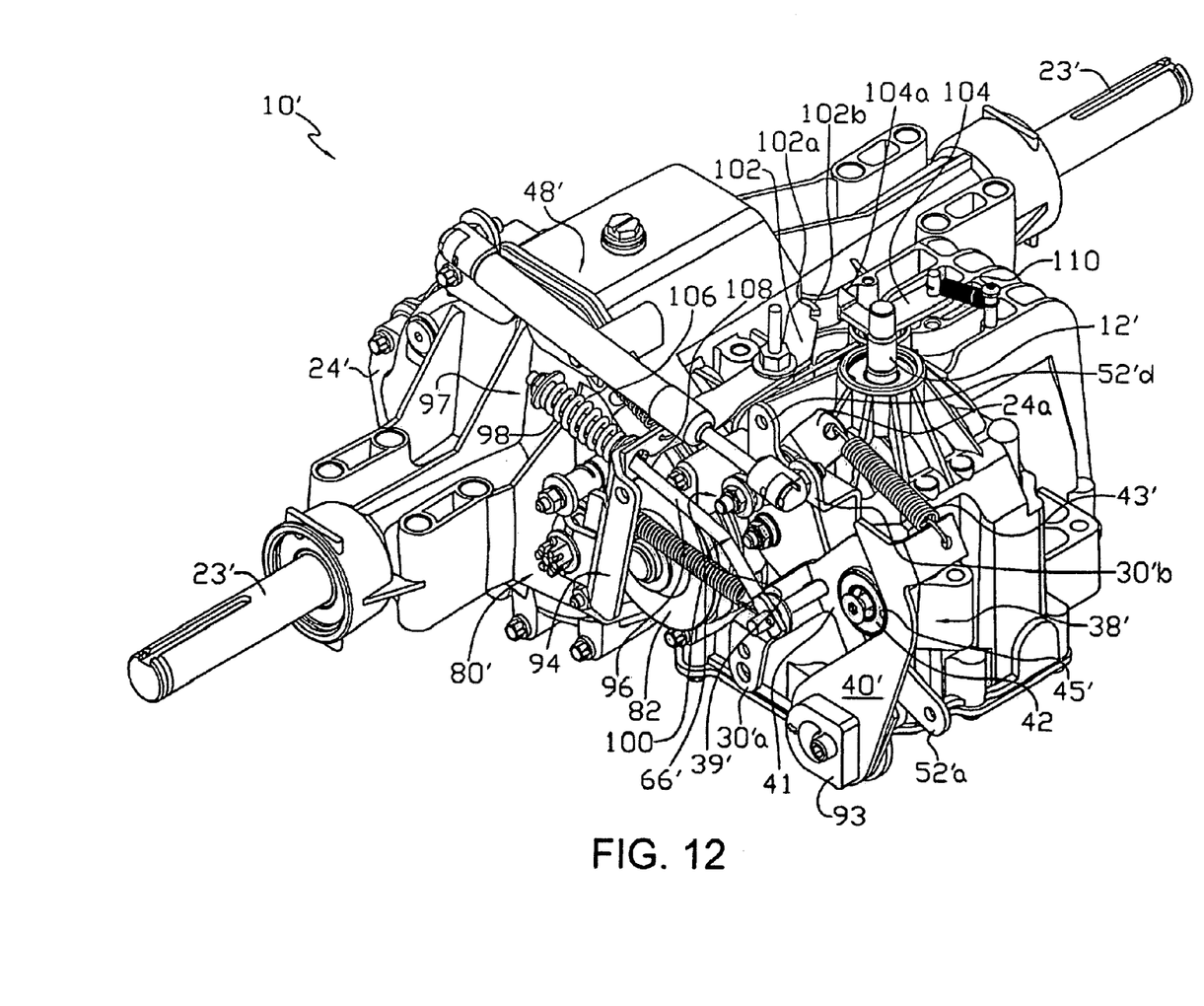
FIG. 12 illustrates an isometric view of the cruise control system illustrated in FIG. 10.

For allowing the IHT 10' to freewheel, the IHT 10' may be provided with a bypass mechanism as described in U.S. Pat. No. 6,374,604 which is incorporated herein by reference in its entirety. The bypass mechanism is preferably provided with a bypass latching arm 102 that cooperates to engage and hold a bypass arm 104 used to drive the bypass mechanism until such time as the bypass latch is defeated, for example, when the brake is activated so as to allow for proper functioning of the IHT 10'. As illustrated in FIGS. 11 and 12, the bypass latching arm 102 is rotationally mounted to the housing 24' and has one end that is adapted to be driven by the brake actuating arm 94 against the bias of a spring 106. To this end, the bypass latching arm 102 includes an opening 108 through which the link 96 passes and a surface that is in abutted engagement with the brake actuating arm 94. In this manner, when the brake is actuated, illustrated in FIG. 12, the brake actuating arm 94 moves the bypass latching arm 102 causing the bypass latching arm 102 to rotate away from the bypass arm 104 which then allow bypass arm spring 110 to move the bypass arm 104 into a disengaged or non-bypass position. When the brake is deactivated, illustrated in FIG. 11, the biasing spring 106 causes the bypass latching arm 102 to rotate into a position that would allow the bypass arm 104 to be move into engagement with the bypass latching arm 102, via a separate linkage not illustrated. It will also be seen that, when the brake lever and linkage are released, the compression of spring 98 against the brake arm 94 is also removed which then allows the force of spring 106 to be transferred through bypass latch arm 102 to brake arm 94 to thereby release engagement of the brake disk 82 from the frictional element. Since the brake arm return spring 100 may come in a variety of configuration that may be used to provide a similar function, this description is not intended to be read as limiting.

For latching the bypass arm 104 to maintain the bypass condition, the bypass latching arm 102 includes a grooved portion 102a adapted to mate with a corresponding feature 104a provided to the bypass arm 104. To allow the bypass arm 104 to be rotated into a position of engagement with the bypass latching arm 102, the bypass latching arm 102 is provided with a cammed surface 102b leading to the grooved portion 102a. In this manner, when the bypass arm 104 is rotated from a non-activated position to an activated position (when the brake is released so that bypass latching arm 102 is appropriately positioned), the bypass arm feature 104a interacts with the cammed surface 102b to cause the bypass latching arm 102 to rotate against the bias of the spring 106 to allow the bypass arm 104 to move relative to the bypass latching arm 102. Movement in this manner continues until the bypass arm feature 104a seats in the grooved portion 102a and the spring 106 returns the bypass latching arm 102 to a position where the grooved portion 102a cooperates with the bypass arm feature 104a to maintain the position of the bypass arm 104.

While specific embodiments of the invention have been described in detail, it will be appreciated by those skilled in the art that various modifications and alternatives to those details could be developed in light of the overall teachings of the disclosure. Accordingly, the particular arrangements of the return to neutral mechanism, dampening mechanism, brake mechanism, etc. disclosed are meant to be illustrative only and not limiting as to the scope of the invention which is to be given the full breadth of the appended claims and any equivalents thereof.

What is claimed is:

1. A control mechanism for a hydraulic assembly, comprising:
   a hydraulic pump;
   a swash plate;
   a control arm linked to the swash plate and moveable in such a manner so as to provide the swash plate with a plurality of non-discrete angular orientations with respect to the hydraulic pump;
   a return to neutral mechanism for moving the control arm from a driving position to a neutral position; and
   a cruise control arm moveable between a first position, where the cruise control arm is disengaged from the control arm, and a second position, where the cruise control arm engages the control arm to resist movement of the control arm from one of a plurality of non-discrete forward driving positions to the neutral position under the influence of the return to neutral mechanism.

2. The control mechanism of claim 1, wherein the engagement between the control arm and the cruise control arm is along two generally flat edges.

3. The control mechanism of claim 1, wherein the cruise control arm is mounted in such a manner so as to rotate about the same axis as the control arm.

4. The control mechanism of claim 1, wherein the range of rotation of the cruise control arm is limited by the interaction of a fastener attached to the hydraulic assembly by a slot formed in the cruise control arm.

5. The control mechanism of claim 4, wherein an adjustable friction mechanism is engaged to the slot.

6. The control mechanism of claim 1, wherein the movement of the cruise control arm is controlled by a mechanical linkage to a control lever.

7. A control mechanism for a hydraulic assembly, comprising:
a hydraulic pump;
a swash plate;
a control mechanism comprising:
   a control arm linked to the swash plate and moveable in such a manner so as to provide the swash plate with a plurality of non-discrete angular orientations with respect to the hydraulic pump; and
   a return to neutral mechanism for moving the control arm from a driving position to a neutral position; and
a cruise control arm moveable between a first position, where the cruise control arm is disengaged from the control mechanism, and a second position, where the cruise control arm engages the control mechanism to resist the action of the return to neutral mechanism.

8. The control mechanism as set forth in claim 7, wherein the cruise control arm engages the control arm to resist the action of the return to neutral mechanism.

9. The control mechanism as set forth in claim 7, wherein the cruise control arm is mounted in such a manner so as to rotate around an axis that is generally collinear with the control arm's axis of rotation.

10. The control mechanism as set forth in claim 7, further comprising a brake mechanism, wherein operation of the brake mechanism overcomes the resistance of the cruise control arm to move the control arm toward the neutral position.

11. The control mechanism as set forth in claim 7, wherein the control arm is actuated by a foot pedal.

12. The control mechanism as set forth in claim 7, wherein the amount of resistance exerted by the cruise control arm on the control arm is adjustable.

13. The control mechanism as set forth in claim 7, wherein the cruise control arm has a plurality of attachment locations for connection to an operator handle.

14. A cruise control mechanism for a hydraulic assembly, comprising:
a hydraulic pump;
a swash plate;
a control arm linked to the swash plate and moveable in such a manner so as to provide the swash plate with a plurality of non-discrete angular orientations with respect to the hydraulic pump; and
a cruise control arm moveable between a first position, where the cruise control arm is disengaged from the control arm, and a second position, where the cruise control arm engages the control arm to resist movement of the control arm in only one direction.

15. The cruise control mechanism of claim 14, wherein:
the hydraulic assembly further comprises a return to neutral mechanism;
the control arm is biased to a neutral position by the return to neutral mechanism; and
the cruise control arm resists the bias force.

16. The cruise control mechanism of claim 14, wherein:
the hydraulic assembly further comprises a brake mechanism; and
actuation of the brake mechanism overcomes the resistance of the cruise control arm to move the control arm toward neutral and then causes to the brake to actuate.

17. The cruise control mechanism of claim 14, wherein the resistance provided by the cruise control arm is adjustable.

18. The cruise control mechanism of claim 14, wherein the cruise control arm further comprises a slot and the hydraulic mechanism further comprises a post and the interaction of the post with the slot limits the range of rotation of the cruise control arm.

19. The cruise control mechanism of claim 18, wherein the post is part of a mechanism that provides adjustable resistance to the cruise control arm.

* * * * *